United States Patent
Yao et al.

(10) Patent No.: US 10,997,491 B2
(45) Date of Patent: May 4, 2021

(54) METHOD OF PREDICTION OF A STATE OF AN OBJECT IN THE ENVIRONMENT USING AN ACTION MODEL OF A NEURAL NETWORK

(71) Applicants: Hengshuai Yao, Markham (CA); Seyed Masoud Nosrati, Markham (CA); Hao Chen, Ottawa (CA); Peyman Yadmellat, North York (CA); Yunfei Zhang, Aurora (CA)

(72) Inventors: Hengshuai Yao, Markham (CA); Seyed Masoud Nosrati, Markham (CA); Hao Chen, Ottawa (CA); Peyman Yadmellat, North York (CA); Yunfei Zhang, Aurora (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 844 days.

(21) Appl. No.: 15/725,043

(22) Filed: Oct. 4, 2017

(65) Prior Publication Data

US 2019/0102668 A1 Apr. 4, 2019

(51) Int. Cl.
   *G06N 3/04* (2006.01)
   *G06N 3/08* (2006.01)
   (Continued)

(52) U.S. Cl.
   CPC ............... *G06N 3/04* (2013.01); *B60W 10/18* (2013.01); *B60W 10/20* (2013.01);
   (Continued)

(58) Field of Classification Search
   None
   See application file for complete search history.

(56) References Cited

U.S. PATENT DOCUMENTS 8,626,565 B2  1/2014  Petroff
9,443,192 B1  9/2016  Cosic
(Continued)

FOREIGN PATENT DOCUMENTS

CN  106080590 A  11/2016
JP  H04274935 A  9/1992

OTHER PUBLICATIONS

Wang et al., Formulation of Deep Reinforcement Learning Architecture Toward Autonomous Driving for On-Ramp Merge, ResearchGate, Sep. 2017, https://www.researchgate.net/publication/319534449, Total pp. 7 (Year: 2017).*
(Continued)

*Primary Examiner* — Alan Chen

(57) ABSTRACT

A method, device and system of prediction of a state of an object in the environment using an action model of a neural network. In accordance with one aspect, a control system for a object comprises a processor, a plurality of sensors coupled to the processor for sensing a current state of the object and an environment in which the object is located, and a first neural network coupled to the processor. One or more predicted subsequent states of the object in the environment are determined using an action model of the neural network and a current state of the object in the environment and an plurality of action sequences. The action model comprises a mapping of states of the object in the environment and actions performed by the object for each state to predicted subsequent states of the object in the environment.

18 Claims, 7 Drawing Sheets

(51) Int. Cl.
| | |
|---|---|
| G05B 13/02 | (2006.01) |
| G05D 1/00 | (2006.01) |
| B60W 10/20 | (2006.01) |
| B60W 10/18 | (2012.01) |
| G05D 1/02 | (2020.01) |
| G06K 9/00 | (2006.01) |
| G05B 17/02 | (2006.01) |
| G08G 1/00 | (2006.01) |
| G06N 3/00 | (2006.01) |

(52) U.S. Cl.
CPC ........... *G05B 13/027* (2013.01); *G05B 17/02* (2013.01); *G05D 1/0088* (2013.01); *G05D 1/0257* (2013.01); *G06K 9/00* (2013.01); *G06N 3/006* (2013.01); *G06N 3/0454* (2013.01); *G06N 3/08* (2013.01); *G08G 1/00* (2013.01); *B60W 2710/18* (2013.01); *B60W 2710/20* (2013.01); *G06N 3/0481* (2013.01)

(56) References Cited

U.S. PATENT DOCUMENTS

| | | | |
|---|---|---|---|
| 9,511,767 | B1 | 12/2016 | Okumura et al. |
| 9,855,894 | B1* | 1/2018 | Khorasani .......... G06K 9/00805 |
| 2007/0043491 | A1 | 2/2007 | Goerick et al. |
| 2011/0060425 | A1 | 3/2011 | Freed |
| 2017/0185087 | A1 | 6/2017 | Petroff |
| 2017/0186125 | A1 | 6/2017 | Petroff |
| 2017/0232613 | A1* | 8/2017 | Ponulak .............. G05D 1/0221 700/253 |
| 2017/0357257 | A1 | 12/2017 | Yang et al. |
| 2017/0371344 | A1* | 12/2017 | Cohen ................. G05D 1/0246 |
| 2018/0089563 | A1* | 3/2018 | Redding ............. G05B 13/027 |
| 2018/0154899 | A1* | 6/2018 | Tiwari ............... B60W 60/0011 |
| 2018/0322783 | A1* | 11/2018 | Toyoda ................ G06T 19/006 |
| 2019/0094040 | A1* | 3/2019 | Lewis ................ G06K 9/00805 |

OTHER PUBLICATIONS

Xia et al., A Control Strategy of Autonomous Vehicles based on Deep Reinforcement Learning, 2016 9th International Symposium on Computational Intelligence and Design, pp. 199-201 (Year: 2016).*

Zhang et al., Query-Efficient Imitation Learning for End-to-End Autonomous Driving, arXiv:1605.06450v1 [cs.LG] May 20, 2016 (Year: 2016).*

Morton et al., Analysis of Recurrent Neural Networks for Probabilistic Modeling of Driver Behavior, IEEE Transactions on Intelligent Transportation Systems, vol. 18, No. 5, May 2017, pp. 1289-1298 (Year: 2017).*

Desjardins et al., Cooperative Adaptive Cruise Control: A Reinforcement Learning Approach, IEEE Transactions on Intelligent Transportation Systems, vol. 12, No. 4, Dec. 2011, pp. 1248-1260 (Year: 2011).*

Deepak Pathak et al, Curiosity-Driven Exploration by Self-Supervised Prediction, 2017 IEEE Conference on Computer Vision and Pattern Recognition Workshops (CVPRW), Aug. 24, 2017, 2 pages.

Jonathan Tremblay, Christopher Dragert and Clark Verbrugge, Target selection for AI companions in FPS games, Proceedings of the 9th International Conference on Foundations of Digital Games, 2014, http://gram.cs.mcgill.ca/papers/tremblay-14-target.pdf.

Unknown Authors, Create an AI Bot in Blueprint: Unreal Engine, Epic Games, at least as early as Oct. 4, 2017, https://wiki.unrealengine.corn/Create_An_AI_Bot_in_Blueprint.

Unknown Authors, Q-learning, Wikipedia, at least as early as Oct. 4, 2017, https://en.wikipedia.org/wiki/Q-learning.

Unknown Authors, A Painless Q-Learning Tutorial, Wikipedia, at least as early as Oct. 4, 2017, http://mnemstudio.org/path-finding-q-learning-tutorial.htm.

* cited by examiner

METHOD OF PREDICTION OF A STATE OF AN OBJECT IN THE ENVIRONMENT USING AN ACTION MODEL OF A NEURAL NETWORK

TECHNICAL FIELD

The present disclosure relates to a method, device and system of prediction of a state of an object in the environment using an action model of a neural network, as well as a method, device and system for selection of an action for an object using a neural network.

BACKGROUND

Vehicle driver assistance systems enhance the awareness and safety of human drivers and autonomous (e.g., self-driving) vehicles increase driver safety and convenience. Autonomous driving is an important aspect of autonomous vehicles. However, as with other aspects of autonomous vehicles, autonomous driving remains a developing field and improvements in autonomous driving are desirable. For example, vehicle dynamics are often based on the bicycle model is used. The bicycle model describes the state of the vehicle using a few variables including the position, orientation, orientation change velocity, etc. The bicycle model consists of a few equations that update the vehicle's state given the vehicle's action including throttle (or acceleration), brake and steering angle. The bicycle model used by a given vehicle control system is based on experience from vehicle system design of vehicle designers. Current models of vehicle dynamics, such as the bicycle model, have various limitations and improvements are desirable.

SUMMARY

The present disclosure provides a method of predicting a subsequent state of an object, such as a vehicle, in the environment based on the object's action. Vehicle action models typically consider only the state of the vehicle, and therefore suffer from inaccuracy in various driving scenarios. When developing artificial intelligence (AI) based autonomous driving vehicles, however, the vehicle's surrounding environment must be considered as the vehicle's state. Because the vehicle is moving, images and other sensory measurements of the environment are also conditioned on the vehicle's action. The present disclosure provides an action model that may be used to predict the state of an object, such as a vehicle, in the environment in the subsequent state which may be used for visualization and other purposes. The action model is trained to perform multi-step prediction, which may be used for visualization and AI based planning, for example, in autonomous driving. The action model is learned from a sample data set collected using a vehicle running in a simulation or on real roads in contrast to other models for vehicle dynamics, such as the bicycle model, which based on experience from vehicle system design of vehicle designers and not learned from data. In particular, the present disclosure uses a neural network to learn an action model from sensor data, such as images, LIDAR, RADAR and/or other sensory measurements and possibly derived data, and a current action, and a subsequent state. The learned action model may then be used to predict the subsequent sensor date, such as images, LIDAR, RADAR and other sensory measurements and possibly derived data for a given state and a given action.

In accordance with one aspect of the present disclosure, there is provided a method of selection of an action for an object using a neural network is disclosed. One or more predicted subsequent states of the object in the environment are determined using an action model of a neural network and a current state of the object in the environment. The action model comprises a mapping of states of the object in the environment and actions performed by the object for each state to predicted subsequent states of the object in the environment. In some examples, the method also comprises sensing the current state of the object and an environment in which the object is located, and obtaining the action for the object. In some examples, the method comprises obtaining a plurality of action sequences each comprising a plurality of actions for the object, wherein the one or more predicted subsequent states of the object in the environment are predicted using the action model, the current state of the object in the environment and the plurality of action sequences.

In accordance with another aspect of the present disclosure, there is provided a control system, comprising a processor, a plurality of sensors coupled to the processor for sensing a current state of the object and an environment in which the object is located, and a first neural network coupled to the processor. One or more predicted subsequent states of the object in the environment are determined using an action model of the neural network and the current state of the object in the environment. The action model comprises a mapping of states of the object in the environment and actions performed by the object for each state to predicted subsequent states of the object in the environment. The first neural network encodes the current state of the object in the environment in which the object is located using sensor data obtained by the plurality of sensors, and obtain the action for the object. In some examples, the method comprises obtaining a plurality of action sequences each comprising a plurality of actions for the object, wherein the one or more predicted subsequent states of the object in the environment are predicted using the action model, the current state of the object in the environment and the plurality of action sequences.

In accordance with a further aspect of the present disclosure, there is provided a method of learning an action model for an object, such as a vehicle, in an environment using a neural network. A subsequent state of the object in the environment, s', is predicted from a current training state, s, from sample data set D {(s, a, s')}, for at least two corresponding training actions, a. A reward is calculated for the subsequent state in accordance with a reward function. A predicted subsequent state, s'*, that produces a maximized reward is selected. A training error is calculated as the difference between the selected predicted subsequent state, s'*, and a corresponding subsequent state of the object in the environment, s' from the sample data set D. Parameters of the neural network to minimize a mean square error (MSE) of the training error are updated.

In accordance with yet a further aspect of the present disclosure, there is provided a control system for an object, such as a vehicle. The control system comprises a processor, at least one sensor coupled to the processor for sensing an environment of the object, and a memory coupled to the processor. The memory stores executable instructions that, when executed by the processor, cause the control system to perform at least parts of the methods described above and herein.

In accordance with yet a further aspect of the present disclosure, there is provided a vehicle comprising a mechanical system for moving the vehicle, a drive control system coupled to the mechanical system for controlling the mechanical system and a vehicle control system coupled to the drive control system. The vehicle control system comprises a processor, at least one sensor coupled to the processor for sensing an environment of a vehicle, and a memory coupled to the processor. The memory stores executable instructions that, when executed by the processor, cause the vehicle control system to perform at least parts of the methods described above and herein.

In accordance with yet a further aspect of the present disclosure, there is provided a non-transitory machine readable medium having tangibly stored thereon executable instructions for execution by a processor of a control system for an object, such as a vehicle. The executable instructions, when executed by the processor, cause the control system to perform at least parts of the methods as described above and herein.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems of localization with reference to a motor vehicle, such as a car, truck, bus, boat, aircraft, warehouse equipment, construction equipment, tractor or other farm equipment. The teachings of the present disclosure are not limited to vehicles, or any particular type of vehicle, and may be applied to other objects, real or virtual, and to vehicles that do not carry passengers as well as vehicles that do carry passengers. The teachings of the present disclosure may also be implemented in non-vehicular mobile robots including, but not limited to, autonomous vacuum cleaners, rovers, lawn mowers and other objects, real or virtual.

Figure 1A:
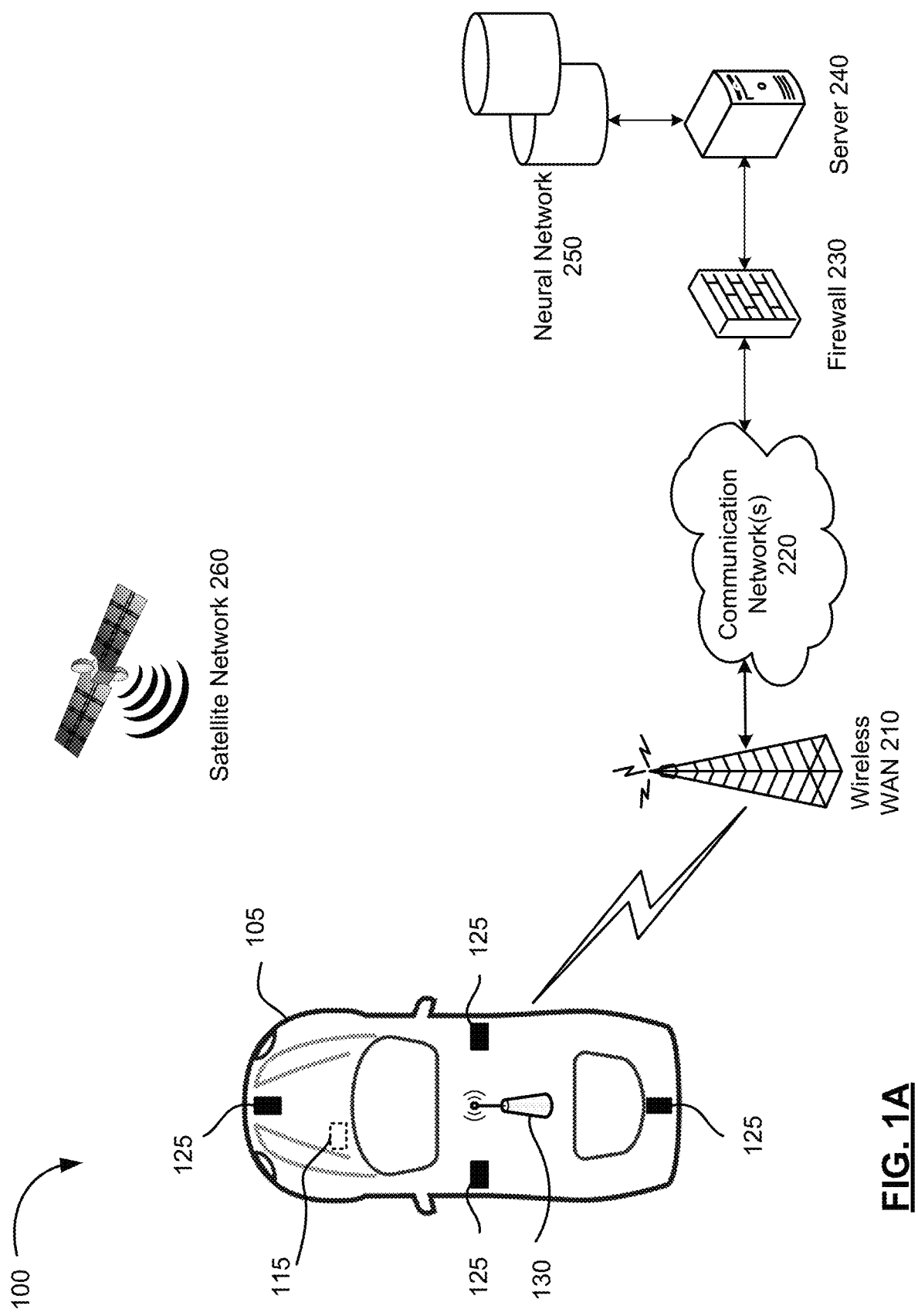
FIGS. 1A and 1B are schematic diagrams of a communication system in accordance with example embodiments of the present disclosure.

FIG. 1A is a schematic view showing selected components of a communication system 100 in accordance with one example embodiment of the present disclosure. The communication system 100 comprises a vehicle control system 115 embedded in a vehicle 105. The vehicle control system 115 is coupled to a drive control system 150 and a mechanical system 190 of the vehicle 105, as described below. The vehicle control system 115 allows the vehicle 105 to be operable in a fully-autonomous, semi-autonomous or fully user-controlled mode.

The communication system 100 comprises a plurality of sensors 110 located about the vehicle 105 and one or more wireless transceivers 130 each coupled to a controller of the vehicle control system 115. The plurality of sensors 110 comprise one or more digital cameras 112, one or more (Light Detection And Ranging) LIDAR units 114, one or more radar units, such as one or more radar synthetic aperture radar (SAR) units 116, an inertial measurement unit (IMU) 118, an electronic compass 119 and possibly other sensors 120. The sensors 110, when active, repeatedly (e.g., in regular intervals) sense information and provide the sensed information to the vehicle control system 115 in real-time or near real-time.

The cameras 112 may capture static images or videos comprising a series of consecutive frames. The cameras 112 may be two-dimensional (2D) cameras or stereoscopic or three-dimensional (3D) cameras that may sense depth and the three-dimensional structure of the environment surrounding the vehicle 105. The cameras 112 may capture visible light, infrared or both. The IMU 118 senses the vehicle's specific force and angular rate using a combination of accelerometers and gyroscopes. Alternatively, one or more of the LIDAR units 114, SAR units 116 and IMU 118 may be used to sense the three-dimensional structure of the environment surrounding the vehicle 105.

Using the sensors 110, the communication system 100 may collect information about a local environment of the vehicle 105 (e.g., any immediately surrounding obstacles) as well as information from a wider vicinity (e.g., the LIDAR units 114 and SAR units 116 may collect information from an area of up to 100 m radius around the vehicle 105). The communication system 100 may also collect information about the position and orientation of the vehicle 105 using the IMU 118. Using the IMU 118 and other sensors the vehicle control system 115 to determine the linear speed (e.g. odometer), angular speed, acceleration and tire grip of the vehicle 105, among other factors.

Figure 1B:
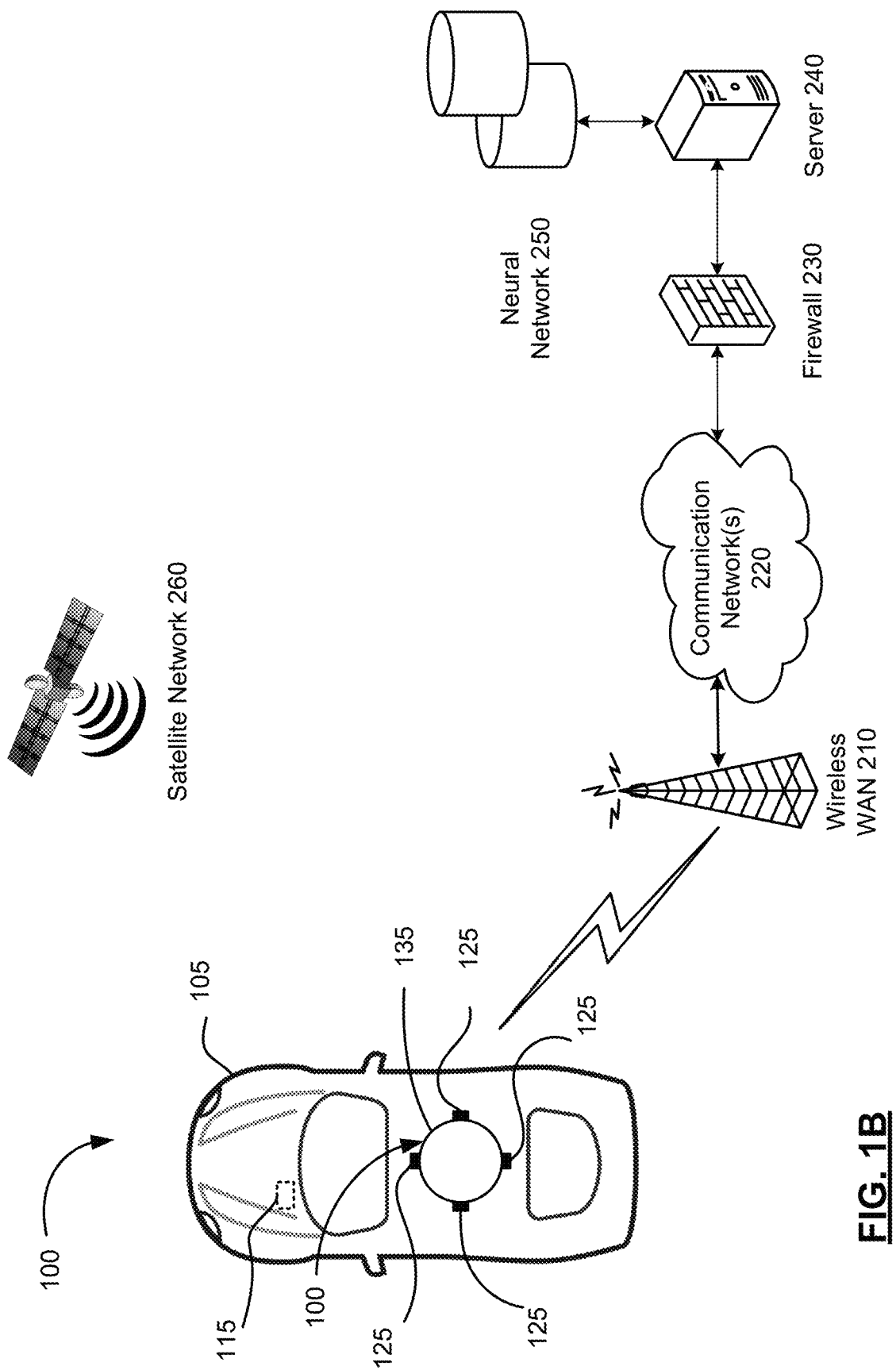

In the shown embodiment, there are four sensors units 125 located at the front, rear, left side and right side of the vehicle 105, respectively. The number and location of the sensor units 125 may be different in other embodiments. For example, FIG. 1B illustrates another embodiment in which the sensor units 125 are located in a housing 135, such as fixed or rotating carousel, that is mounted or otherwise located on the top (e.g., roof) of the vehicle 105. The sensor units are located at the front, rear, left side and right side of the housing 135 (and consequently the vehicle 105), respectively, to scan the environment in front, rear, left side and right side of the vehicle 105. In the described embodiments, the sensor units 125 are oriented in four different directions to scan the environment in the front, rear, left side and right side of the vehicle 105.

The sensor units 125 may comprise one or any combination of cameras 112, LIDAR units 114, and SAR units 116. The sensor units 125 are mounted or otherwise located to have different fields of view (FOVs) between adjacent sensor units 125 to capture the environment surrounding the vehicle 105. The different FOVs may be overlapping.

The wireless transceivers 130 enable the vehicle control system 115 to exchange data and optionally voice communications with a wireless wide area network (WAN) 210. The communication system 100 may use the wireless WAN 210 to access a server 240, such as a driving assist server, via one or more communications networks 220, such as the Internet. The server 240 may be implemented as one or more server modules and is typically located behind a firewall 230. The server 240 is connected to a neural network 250, described below. Alternatively, the neural network 250 may be part of or connected to the vehicle control system 115 located in the vehicle. The neural network 250 comprises or is connected to a neural network controller (not shown). The neural network 250 may comprises software stored by the vehicle control system 115, such as executable instructions stored in a memory coupled to the processor, that, when executed by the processor, cause the vehicle control system to operate in a specified manner.

The communication system 100 also includes a satellite receiver 132. The communication system 100 may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Figure 2:
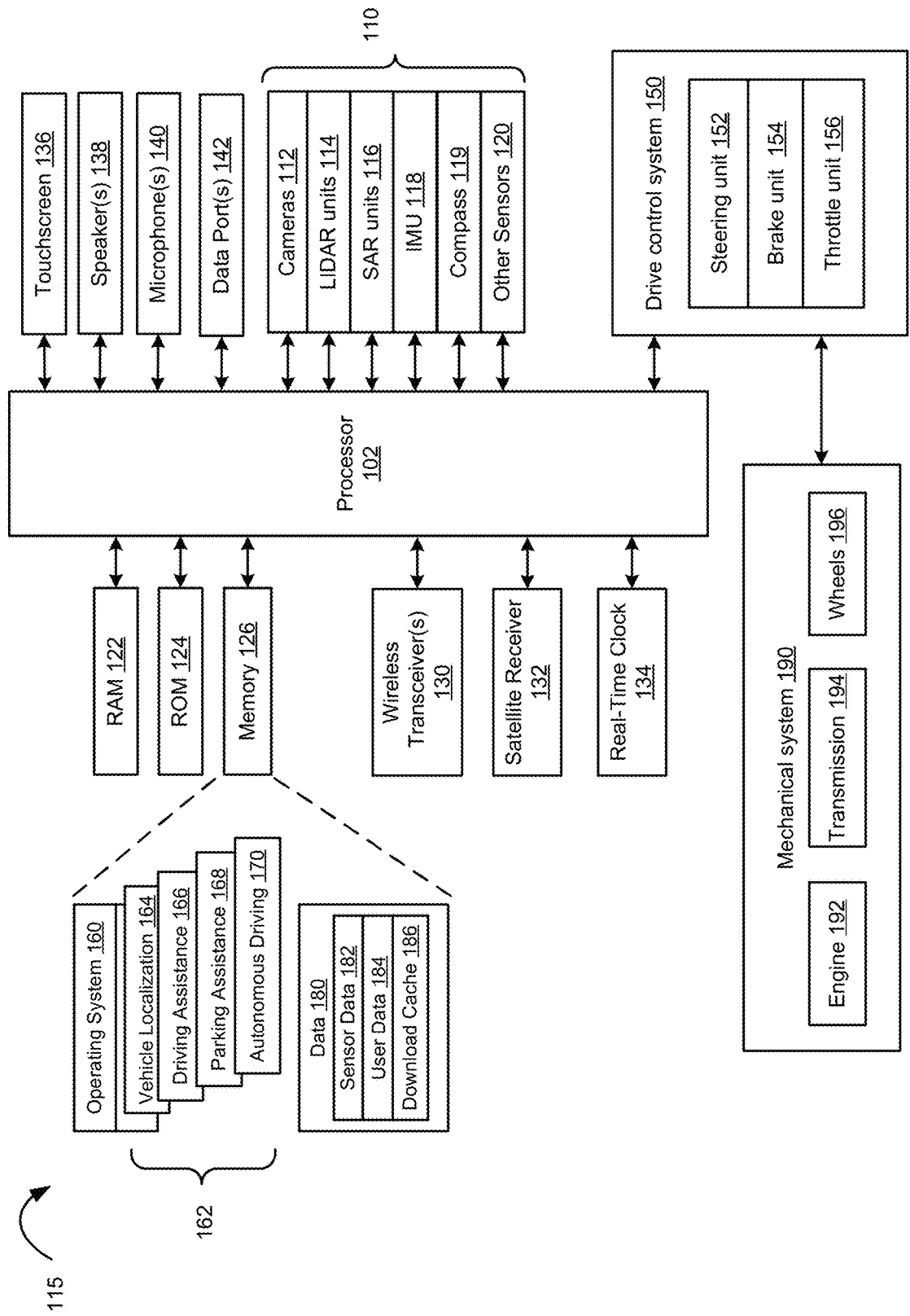
FIG. 2 is a block diagram of a vehicle control system suitable for use in the communication system of the present disclosure.

Reference is next made to FIG. 2 which illustrates selected components of the vehicle control system 115 in accordance with an example embodiment of the present disclosure. The processor 102 is coupled to a plurality of components via a communication bus (not shown) which provides a communication path between the components and the processor 102. The processor 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network 210, a satellite receiver 132 for receiving satellite signals from a satellite network 260 that comprises a plurality of satellites which are part of a global or regional satellite navigation system, a real-time clock (RTC) 134, and a touchscreen 136.

The wireless transceivers 130 may comprise one or more cellular (RF) transceivers for communicating with a plurality of different radio access networks (e.g., cellular networks) using different wireless data communication protocols and standards. The communication system 100 may communicate with any one of a plurality of fixed transceiver base stations (one of which is shown in FIG. 1) of the wireless WAN 210 (e.g., cellular network) within its geographic coverage area. The wireless transceiver(s) 130 may send and receive signals over the wireless WAN 210. The wireless transceivers 130 may comprise a multi-band cellular transceiver that supports multiple radio frequency bands.

The wireless transceivers 130 may also comprise a wireless local area network (WLAN) transceiver for communicating with a WLAN (now shown) via a WLAN access point (AP). The WLAN may comprise a Wi-Fi wireless network which conforms to IEEE 802.11x standards (sometimes referred to as Wi-Fi®) or other communication protocol.

The wireless transceivers 130 may also comprise a short-range wireless transceiver, such as a Bluetooth® transceiver, for communicating with a mobile computing device, such as a smartphone or tablet. The wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The RTC 134 typically comprises a crystal oscillator that provides accurate real-time information, such as those provided by Atmel Corporation.

The touchscreen 136 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The vehicle control system 115 also includes a drive control system 150 that serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, received path information received from a path planning system (not shown) and generate control signals to control the steering, braking and throttle of the vehicle 105, respectively to drive a planned path. The drive control system 150 may include additional components to control other aspects of the vehicle 105 including, for example, control of turn signals and brake lights.

The mechanical system 190 receives control signals from the drive control system 115 to operate the mechanical components of the vehicle 105. The mechanical system 180 effects physical operation of the vehicle 105. The mechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor 102. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 126 has stored thereon operating system software 160 that is executed by the processor 102 as well as a number of applications 162 in addition to the GUI. The applications 160 include vehicle localization 164, parking assistance 166, autonomous parking 168, driving assistance 170 for semi-autonomous driving, and autonomous driving 172 for fully autonomous driving. Other applications such as mapping, navigation, climate control, media player, telephone and messaging applications, etc. are also stored in the memory. The vehicle localization 164, when executed by the processor 102, causes the operations of method 500 to be performed.

The memory 126 also stores a variety of data 180. The data 180 may comprise sensor data 182 sensed by the sensors 110, user data 184 comprising user preferences, settings and optionally personal media files (e.g., music, videos, directions, etc.), and a download cache 186 comprising data downloaded via the wireless transceivers 130. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

Figure 3:
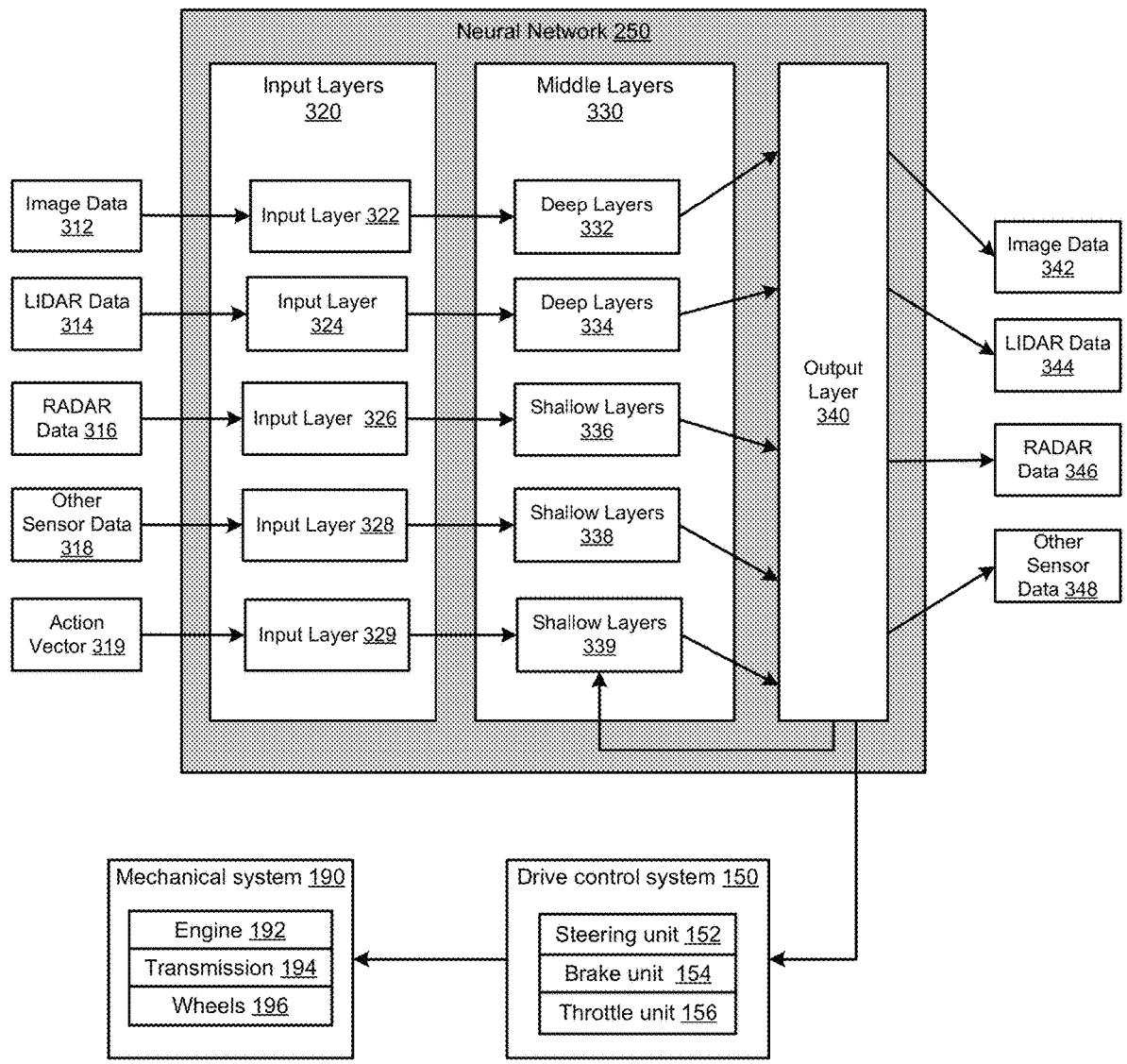
FIG. 3 is a schematic diagram which illustrates a neural network in accordance with one example embodiment of the present disclosure.

Reference is next made to FIG. 3 which illustrates a neural network 250 in accordance with one example embodiment of the present disclosure. The neural network 250 may be used for the neural network 250 in the communication system 100 of FIG. 1A or FIG. 1B, described above. The neural network 250 comprises a number of nodes (also known as neurons) arranged in a plurality of layers comprising an input layer 320, a plurality of middle (hidden) layers 330, and an output layer 340. Each of the layers 320, 330, 340 is a grouping of one or more nodes that are independent of each other and which allow for parallel computing.

Figure 4:
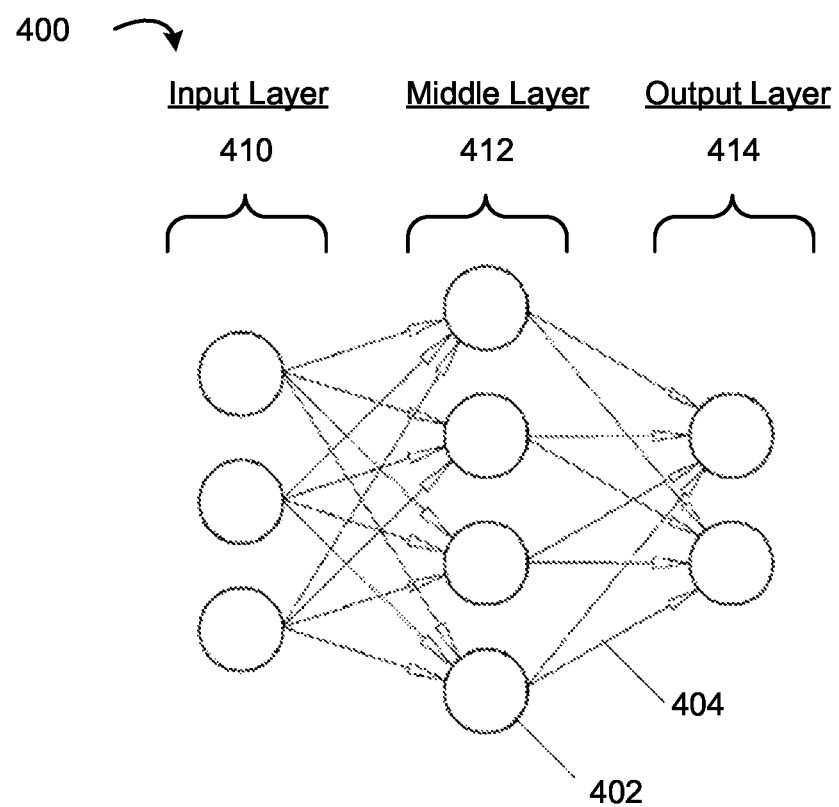
FIG. 4 is a schematic diagram showing an example configuration of nodes in a neural network.

For the purpose of explanation, reference will now be made to FIG. 4 which illustrates an example configuration of nodes 402 (only one of which is labelled in FIG. 4) in a neural network 400 in schematic diagram form. The neural network 400 comprises a number of nodes 402 arranged in a plurality layers comprising an input layer 410, a single middle (hidden) layer 412, and an output layer 414. The output of each node 402 in a given layer is connected to the output of one or more nodes 402 in a subsequent layer, as indicated by connections 404 (only one of which is labelled in FIG. 4). Each node 402 is a logical programming unit that performs an activation function (also known as a transfer function) for transforming or manipulating data based on its inputs, a weight (if any) and bias factor(s) (if any) to generate an output. The activation function of each node 402 results in a particular output in response to particular input(s), weight(s) and bias(es). The inputs of each node 402 may be scalar, vectors, matrices, objects, data structures and/or other items or references thereto. Each node 402 may store its respective activation fiction, weighting (if any) and bias factors (if any) independent of other nodes 402.

Examples of activation functions include mathematical functions (i.e. addition, subtraction, multiplication, divisions, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions depending on the type of input(s). In some examples, the activation function comprises one or both of summing or mapping functions.

Referring again to FIG. 3, each node of the input layer 330 receives sensor data from the sensor units 125 as input. In the shown example, the sensor data comprises image data 312 from the cameras 112, LIDAR data 314 from the LIDAR units 114, RADAR data 316 such as SAR data from the SAR units 116, and possibly other sensor data 318 from other sensors 120 such as the IMU 118. The data 312, 314, 316 and 318 comprises captured or measured data which may be, for example, in the form of vector, matrix or scalar depending on the type of data. In the shown embodiment, the image data 312 is received by a respective input layer 322, the LIDAR data 314 is received by a respective input layer 324, the RADAR data 316 is received by a respective input layer 326, and the other sensor data 318 is received by a respective input layer 328. One or more action vectors 319 are also received as input by a respective input layer 329, as described in more detail below. The action vectors 319 may be chosen by the vehicle control system 115 (e.g., using the neural network 250) or a human driver. In the described example, the action vector 319 comprises a steering angle vector for the steering unit 152, throttle vector for a throttle unit 156 and braking vector for a braking unit 154. In other examples, the action vector 319 may include fewer, additional or different components. The neural network 250 is in many respects a composite neural network comprises of neural networks for each of the respective input data types.

A weight may be set for each of the one or more of the inputs of the input layers 320 and subsequent nodes of the middle layers 330 and the output layer 340 of the neural network 250. A weight is a numerical value, usually between 0 and 1, that indicates the connection strength between a node in one layer and a node in a subsequent layer. An offset (or bias) may also be set for each of the inputs of the input layers 320 and subsequent nodes of the middle layers 330 and the output layer 340 of the neural network 250.

A scalar product between each input of the input layers 320 and its respective weight and bias are determined and sent to a respective node of the first middle layer 330 as input. Each of the scalar products are concatenated into another vector, and another scalar product between the input of the first middle layer 330 and its respective weight and bias is determined and sent to a node of the second middle layer 330 as input. This process is repeated in sequence through each of the middle layers 330 up to the output layer 340.

The number of middle layers 330, the number nodes in each of the layers 320, 330 and 340, and the connections between the nodes of each layer may vary between embodiments based on the input(s) (e.g., sensor data) and output(s) to the physical system (i.e., the vehicle control system 115, which are determined by the controllable elements of the vehicle 105). The weight and bias of each node and possibly even the activation function of the nodes of the neural network 250 are determined for optimal performance of an autonomous driving operation through a learning process such as reinforcement learning, described below.

In the shown example, the middle layers 330 comprise deep layers 332 connected to the nodes of the input layer 322 of the image data 312, deep layers 334 connected to the nodes of the input layer 324 of the LIDAR data 314, shallow layers 336 connected to the nodes of the input layer 326 of the RADAR data 316, shallow layers 338 connected to the nodes of input layer 328 of the other sensor data 318, and shallow layers 339 connected to the nodes of the input layer 329 of the action vector 319. The middle layers 330 are connected to the output layer 340 which merges the output of the middle layers 330 by concatenating the outputs (e.g., vectors) of the deep layers 332, 334 and the shallow layers 336, 338 and 339 and generates an output in form of one or more predicted subsequent states of the vehicle 105 in the environment. In the described example, the neural network 304 includes deep layers (e.g., fully connected layers and convolution layers) to encode the images 312 from the cameras 112 on the vehicle 105, deep layers to encode the LIDAR measurements 314 from the LIDAR units 114 on the vehicle 105, shallow layers to encode the RADAR measurements 316 from the SAR units 116, and shallow layers 328 to encode any other sensory measurements from other sensors 110, and shallow layers to encode the current action specified by the action vector 319. A different configuration may be used in other embodiments.

The neural network 250 defines an action model for the state of the vehicle 105 in the environment. The action model maps state-action pairs, denoted (s, a), comprising a state of the vehicle 105 in the environment denoted s, and an action performed by the vehicle 105, denoted a, to a predicted subsequent state of the vehicle 105 in the environment, denoted s': (s, a) s'. The action model maps a plurality of states of the vehicle 105 in the environment and a plurality of actions performed by the vehicle 105 for each state, i.e. state-action pairs, to predicted subsequent states of the vehicle 105 in the environment. Given a current state of the vehicle 105 in the environment sensed by the sensor units 125, and an action chosen by the vehicle control system 115 (e.g., using the neural network 250) or a human driver, the neural network 250 uses the action model to predict a subsequent (future) state of the vehicle 105 in the environment.

Each action has multiple dimensions. In the described example, each action has three dimensions: steering angle for the steering unit 152, a throttle value for a throttle unit 156 and a braking value for a braking unit 154. It will be appreciated that the steering angle, throttle value and braking value may have a value of zero in some scenarios. The current state, s, and subsequent state, s', includes not only the vehicle's state but also includes the environment's state (e.g., measurement of the vehicle 105 with respective to the environment) at the same time, t. For example, the state, s, at time, t, includes:

sensor data including current camera views, including: current images of all the cameras 112 installed on the vehicle 105; current LIDAR measurements; and current RADAR and other sensory measurements such as current GNSS data from the satellite receiver 132, current compass reading, current IMU reading, current speed reading of a speedometer, etc.;

data derived from current and/or past sensor data including: current distance from the vehicle's center to a lane axis, or when a lane is not available, the current distance from the vehicle's center to a predefined path; current distance from the vehicle's center to center line, left lane line, and right lane line; current distance to other environmental references, etc.;

current speed or velocity (e.g., based on a change in GNSS data between current and past sensor readings), etc.

Figure 5:
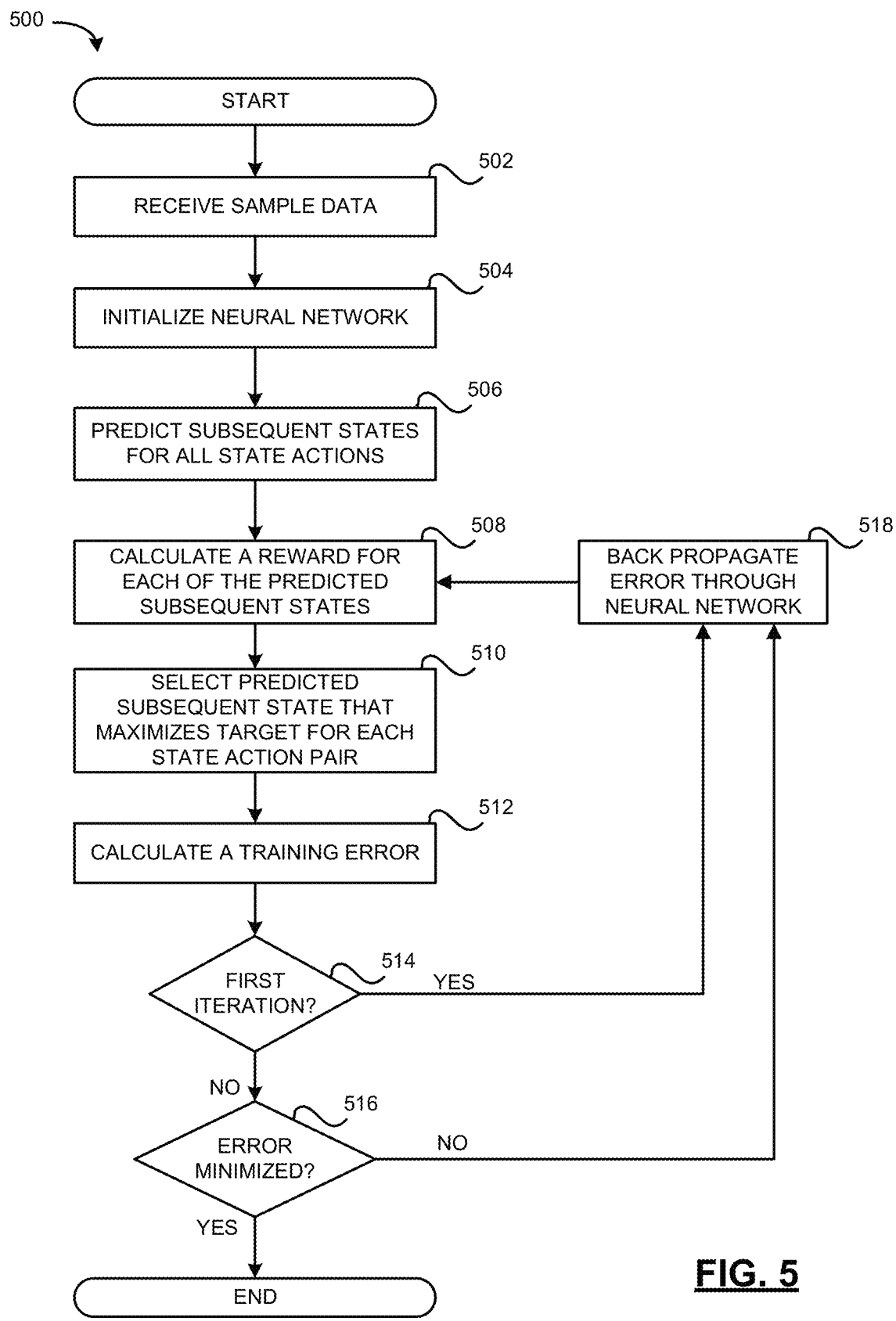
FIG. 5 is a flowchart illustrating an example method of reinforcement learning to learn an action model in accordance with one example embodiment of the present disclosure.

Referring to FIG. 5, example method 500 of using deep learning to train an action model for a vehicle 105 in accordance with one example embodiment of the present disclosure will be described. The method 500 may be carried out by software executed, for example, by the processor 102 of the vehicle control system 115 or a neural network controller depending on whether the neural network 250 is located in the vehicle 105.

In the method 500, a policy for predicting a value of a next state of the vehicle 105 in the environment is developed for each possible state-action pair of the vehicle 105 in the environment based on at least a reward value. An actual state-action pair may then be associated with one of the possible state-action pairs and a subsequent state associated with the policy for the associated state-action pair is determined.

At operation 502 of the method 500, a sample training data set D {(s, a, s')} is received as input, wherein s is the current state of the vehicle 105 in the environment, a is the action chosen by the vehicle 105, and s' is the subsequent state of the vehicle 105 in the environment. The current state of the vehicle 105 in the environment, s, and the subsequent state of the vehicle 105 in the environment, s', are vectors as described above. The action, a, has multiple dimensions such as steering angle, throttle and braking The sample data set comprises a large number of samples in the form of a tuple (s, a, s'). The sample data set may be collected by driving the vehicle 105 in various scenarios including highway, parking lots, intersections, residential areas, roundabouts, etc.

At operation 504, the neural network 250 is initialized with random or arbitrary weights set by the AI designer.

At operation 506, the neural network 250 predicts a subsequent state, s', of the vehicle 105 in the environment for each possible action, a. The predicted subsequent state, s', is a vector similar to the current state of the vehicle 105 in the environment, s, and the subsequent state of the vehicle 105 in the environment, s', and comprising the same elements such as, for example, such as: predicted distance from the vehicle's center to a lane axis, or when a lane is not available, the predicted distance from the vehicle's center to a predefined path; predicted distance from the vehicle's center to center line, left lane line, and right lane line; predicted camera views, including predicted images of all the cameras 112 installed on the vehicle 105; predicted LIDAR measurements; and predicted RADAR and other sensory measurements.

At operation 508, a reward value is calculated for each of the predicted subsequent states of the vehicle 105 in the environment, s', in accordance with a reward function. The reward may be a measure of the performance of the neural network 250 in the performance of an operation over a sequence of actions, such as autonomous driving or parking operation.

At operation 510, the predicted subsequent state, s', that maximizes the reward is selected as the selected subsequent state, s'*, for each state-action pair, (s, a).

At operation 512, a training error is calculated. The training error is calculated as the difference between the selected predicted subsequent state of the vehicle 105 in the environment, s'*, and the subsequent state of the vehicle in the environment, s', specified in the sample data set, D {(s, a, s')}.

At operations 514 and 516, the neural network 250 determines whether the present iteration is the first iteration using a counter or the like. The counter is incremented during each iteration of the operations 508 to 512 and at any time after the reward is calculated in operation 508. If it is not the first iteration, the neural network 250 determines whether the error has not been minimized. For example, the action network 250 may be trained using a least mean square (LMS) algorithm that minimizes a mean square error (MSE) of the training error. In some examples, the MSE is defined in accordance with the following equation:

$$\sum_{i=1}^{n}(s' - s'^{*}(s, a))^2$$

wherein n is the number of values, wherein the sum is over all of the samples in the sample data set D {(s, a, s')}, s'* (s, a) is the selected predicted subsequent state of the vehicle in the environment by the action network 250 based on an input of state s and action a (i.e., a given state-action pair (s, a)).

If it is not the first iteration and the error has not been minimized, the operation proceed to operation 518, at which the action network 250 back propagates the calculated error as an error signal to all of the previous layers of the action network 250 to update the parameters (e.g., weights) of the action network 250, thus reducing the error. If it is not the first iteration and the error has been minimized, the method 500 ends with a trained action network 250 as output.

In view of the above, it will be appreciated that the training of method 500 is used to adjust the parameters of the action network 250 (e.g., weighting and bias factors and possibly even the activation function of the nodes), for example, using a gradient descent that minimizes the MSE. This process is done iteratively and is referred to as "tuning". With each iteration, the MSE decreases until the parameters of the action network 250 are optimized. The goal is to minimize the MSE between the predicted subsequent state and the subsequent state from the sample data set for a given state s and action a. Typically, only parameters of the middle layers 330 are changed.

After the action network 250 is trained, it may be used in real-time operations to predict the effects of the vehicle's action by predicting the subsequent states of the vehicle 105 in the environment. The predicted subsequent states of the vehicle 105 in the environment may be used in real-time autonomous applications, such as autonomous driving or parking of the vehicle 105 as described herein.

Figure 6:
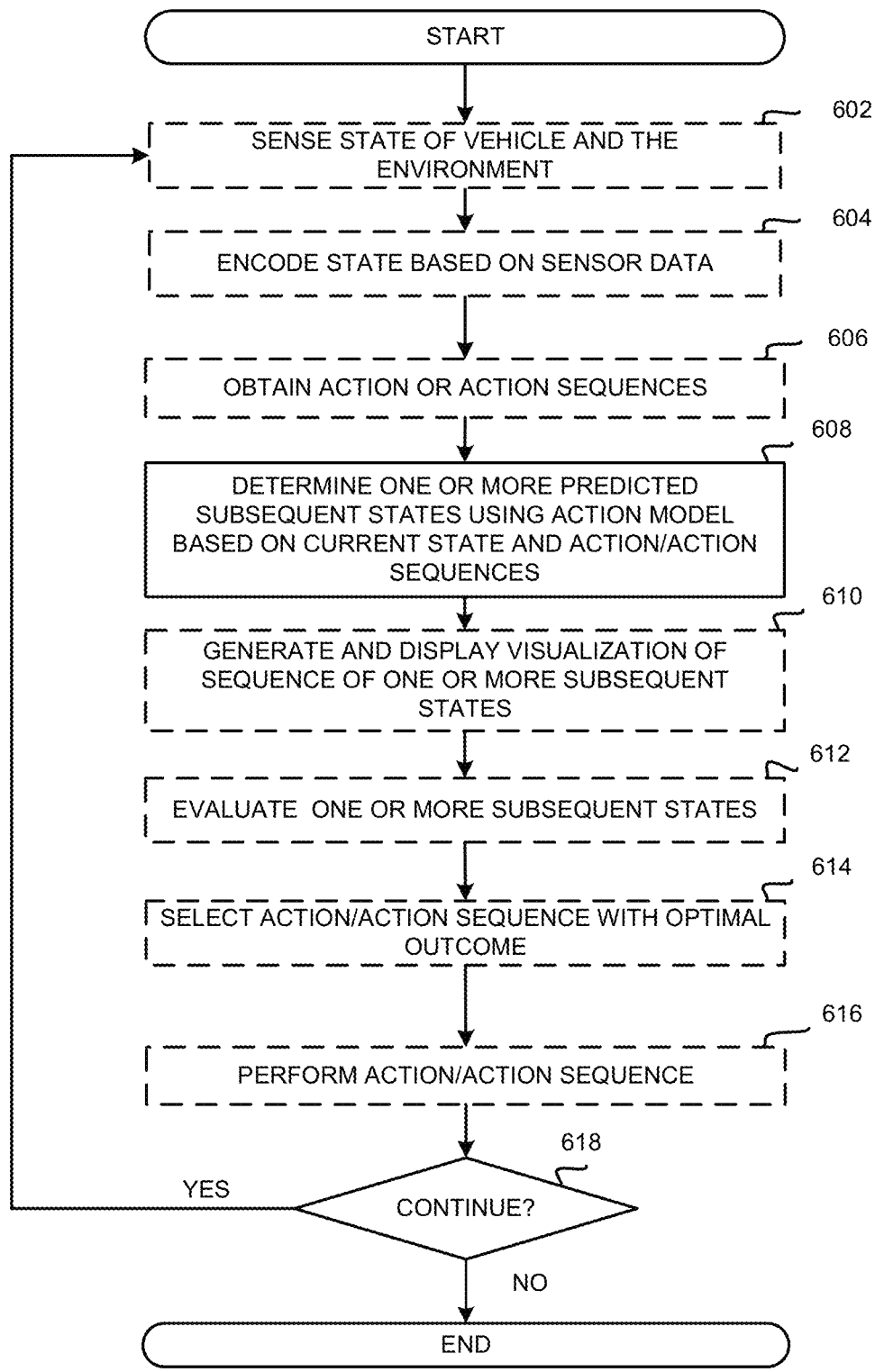
FIG. 6 is a flowchart illustrating an example method of selection of an action for a vehicle using a neural network in accordance with one example embodiment of the present disclosure.

Referring to FIG. 6, an example method 600 of predicting a subsequent state of the vehicle 105 and its environment using a neural network and selection of an action for the vehicle 105 in accordance with one example embodiment of the present disclosure will be described. The method may be used, for example, in autonomous driving or parking operations. The method 600 may be initiated by the vehicle control system 115 when in an autonomous mode, such as an autonomous driving or parking mode. The autonomous mode may be initiated in response to input from a user or may be initiated automatically without input from the user in response to detection of more or more triggers. The method 600 may be carried out by software executed, for example, by the processor of the vehicle control system 115, a neural network controller, or a combination thereof, depending on whether the neural network 250 is located in the vehicle 105.

At operation 602, the vehicle control system 115 senses a state of the vehicle and an environment of the vehicle 105 using the sensors 110 to obtain sensor data that is provided to the neural network 250. At operation 604, the neural network 250 uses the sensor data to encode a state, s, representing the vehicle 105 in the environment. The neural network 250 receives raw inputs from the cameras 112, LIDAR units 114, SAR units 116, and other sensory measurements.

At operation 606, the neural network 250 receives at least one action from the vehicle control system 115. In some examples, a plurality of action sequences, each comprising one or more actions denoted a1, a2, . . . ak, are received from the vehicle control system 115. Each action, a, defined by an action vector 319. Each action vector 319 comprises a steering angle for the steering unit 152, a throttle value for a throttle unit 158 and a braking value for a braking unit 154. It will be appreciated that the steering angle, throttle value and braking value may have a value of zero in some scenarios.

At operation 608, the neural network 250 determines at least one predicted subsequent state, s', of the vehicle 105 in the environment using the current state, s, and the at least one action. In some examples, the neural network 250 determines a predicted subsequent state, s', of the vehicle 105 in the environment using the current state for each of the actions, a1, a2, . . . ak of each action sequence. In such examples, the neural network 250 predicts a plurality of state sequences comprising a plurality of subsequent states, s', of the vehicle 105 in the environment after taking each of the k actions starting from the current state, s, for each action sequence. The neural network 250 uses the encoded state, s, and first action, a1 from a particular action sequence to determines a first predicted subsequent state of the vehicle in the environment, $s'_{a1}$ for that action sequence. The neural network 250 uses the first predicted subsequent state, $s'_{a1}$, and the second action, a2 for the particular action sequence to determine a second predicted subsequent state of the vehicle in the environment, $s'_{a2}$, and so on so forth up to the kth action, for each of the action sequences.

Each of the predicted subsequent states s' is defined by a vector comprising predicted sensor data and predicted data derived from current and/or past sensor data. The predicted sensor data may comprise predicted image data 342, predicted LIDAR data 344, predicted RADAR data 348, and possibly other predicted sensor data 348 based on current and/or historical images and sensory measurements such as GNSS data, a compass reading, IMU reading, speed or velocity, etc. The predicted image data may comprise simulated or synthesized images generated by the vehicle control system 115 using current and/or historical images and various algorithms for computer generated images (CGI) which, for example, may be based on interpolation and/or extrapolation from the current and/or historical images and the predicted LIDAR data 344, predicted RADAR data 348, and possibly other predicted sensor data 348. Many algorithms for synthesizing CGI are known in the art. The particular CGI algorithms that are used and the operation of such CGI algorithms are outside of the scope of the present disclosure. The predicted sensor data derived from current and/or past sensor data may comprise: distance from the vehicle's center to a lane axis, or when a lane is not available, the distance from the vehicle's center to a predefined path; distance from the vehicle's center to center line, left lane line, and right lane line; distance to other environmental references, etc.; speed or velocity, etc.

At operation 610, a visualization of the at least one predicted subsequent state, s', of the vehicle 105 in the environment may be displayed on a display of the vehicle control system 115, such as the touchscreen 138. In some examples, the visualization comprises one or more of the sequences of predicted subsequent states, s', such as a state sequence s, $s'_{a1}$ $s'_{a2}$, $s'_{ak}$, may be displayed. The visualization represents the predicted state of the vehicle 105 in the environment in k time steps. The visualization may comprise predicted image data overlayed with one or more of predicted LIDAR data, predicted RADAR data and optionally other predicted sensor data and/or data derived from current and/or past sensor data.

At operation 612, the neural network 250 evaluates the possible outcomes based on the current state and the least one predicted subsequent state. In some examples, the neural network 250 evaluates the possible outcomes based on the current state and one or more sequences of predicted subsequent states, s', such as a state sequence s, $s'_{a1}$ $s'_{a2}$, $s'_{ak}$, by determining a value, denoted Q (s, a) of a policy function, denoted Q, for each action sequence by generating a plurality of policy values, Q (s, a). The policy function Q may be determined, for example, using Q-learning, SARSA, temporal difference learning or other reinforcement learning techniques. The policy function Q is represented by the nodes of the output layer 340, weights and bias factors (if any).

At operation 614, the neural network 250 selects an action (or action sequence) predicted to have the optimal outcome by selecting an action (or action sequence) that maximizes the value of the policy function, e.g. the action (or action sequence) that corresponds to the maximum value of Q (s, a).

At 616, the vehicle 105 performs the selected action or selected action sequence a1, a2, . . . ak. As noted above, each action has multiple dimensions, and in the described example, each action comprises a steering angle for the steering unit 152, a throttle value for a throttle unit 156 and a braking value for a braking unit 154. It will be appreciated that the steering angle, throttle value and braking value may have a value of zero in some scenarios.

At operation 618, the vehicle control system 115 determines whether to continue the method 600, i.e. whether the autonomous mode remains enabled. The vehicle control system 115 repeats the operations 602 to 616 until the autonomous mode is disabled.

In examples in which the neural network 250 is located remotely, the method further comprises sending sensor data acquired by the sensor unit 125 in operation 602 to the neural network 250 and receiving the selected action to be performed by the vehicle control system to 115 from the neural network 250. When the neural network 250 is located in the vehicle 105, for example as part of the vehicle control system 115, these operations are not performed.

The present disclosure provides a method of predicting a subsequent state of a vehicle in the environment based on the vehicle's action. Vehicle action models typically consider only the state of the vehicle, and therefore suffer from inaccuracy in various driving scenarios. However, when developing AI based autonomous driving vehicles, the vehicle's surrounding environment must be considered as the vehicle's state. Because the vehicle is moving, images and other sensory measurements of the environment are also conditioned on the vehicle's action. The present disclosure provides a vehicle action model that may be used to predict the state of a vehicle in the environment in the subsequent which may be used for visualization and other purposes. The action model is trained to perform multi-step prediction, which may be used for visualization and AI based planning, for example, in autonomous driving. The action model is learned from a sample data set provided collected using a vehicle 105 running in a simulation or on real roads in contrast to other models for vehicle dynamics, such as the bicycle model, which based on the experiences from vehicle system design of vehicle designers and not learned from data. In particular, the present disclosure uses neural networks to learn an action model from current images, LIDAR, RADAR and other sensory measurements together with a current action, and to use the action model to predict the next images, LIDAR, RADAR and other sensory measurements.

The present disclosure also provides a neural network architecture, possibly with very deep layers, to predict subsequent image and sensory measures based on current and/or historical images and sensory measurements.

The method of the present disclosure provides a data driven and learning based model to predict the effects of taking actions, such as vehicles actions when applied to autonomous driving vehicles. The method of the present disclosure may be more accuracy and robust than conventional methods based on vehicle models that only predict the state of the vehicle without regard to the state of the environment, which are inaccurate in various driving scenarios. The method of the present disclosure may be especially useful for reinforcement learning based planning for autonomous driving vehicles. In particular, the action model and multi-step prediction of the present disclosure may form the basis of reinforcement learning based self-driving vehicles. The method of the present disclosure may be used in most or all-weather driving conditions, including raining and snowing conditions.

Although the present disclosure has been described in the context of example methods for autonomous driving or parking operations, it is contemplated that the methods described herein could be used in other AI applications to predict a subsequent state of another type of object and its environment, which may be real or virtual, using a neural network and selection of an action for that object. For example, the methods of the present disclosure may be used in gaming or other simulated CGI applications, or drone navigation.

Further, it will be appreciated that the methods and apparatus disclosed herein may be adapted beyond any vehicle to other applications that are susceptible to the formulation of the "state-action-subsequent state" dynamic, such as robotic applications. Examples include industrial machinery, photography, office equipment, power generation and transmission.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory 126 of the vehicle control system 115 or a memory of a neural network controller (not shown). The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A control system for a vehicle, comprising:
a processor;
a plurality of sensors coupled to the processor for sensing a current state of the vehicle and an environment in which the vehicle is located;
an action neural network comprising a plurality of layers, the action neural network coupled to the processor and configured to:
encode the sensor data received from the plurality of sensors into a current state representing the vehicle in the environment in which the vehicle is located;
receive a plurality of action sequences for the vehicle, each action sequence comprising a plurality of actions for the vehicle, wherein each action comprises one or more of a steering angle for a steering unit of the vehicle, a throttle value for a throttle unit of the vehicle and braking value for a braking unit of the vehicle;
for each action sequence in the plurality of action sequences:
determine a state sequence comprising a plurality of predicted subsequent states ($s'_a$) of the vehicle in the environment based on the current state of the vehicle in the environment and the actions in the respective action sequence, wherein layers of the plurality of layers of the action neural network map state-action pairs (s, a) to a subsequent state ($s'_a$) of the vehicle in the environment;
determine a value of a policy function for the action sequence based on the determined state sequence;
select an action sequence in the plurality of action sequences having a maximum value of the policy function;
wherein the processor is configured to receive the selected action sequence from the action neural network and to cause the vehicle to perform the actions in the selected action sequence.

2. The control system of claim 1, wherein the control system is configured to:
display on a display of the vehicle a visualization of the one or more predicted subsequent states of the vehicle in the environment for each state sequence.

3. The control system of claim 1, wherein the current state of the vehicle in the environment is sensed using one or more of cameras, LIDAR and RADAR, wherein the current state of the vehicle in the environment is described by one or more of images, LIDAR measurements and RADAR measurements.

4. The control system of claim 3, wherein determining the state sequence for each action sequence in the plurality of action sequences comprises determining the plurality of predicted subsequent states of the vehicle in the environment, wherein determining a predicted subsequent state of the vehicle in the environment in the plurality of predicted subsequent states of the vehicle in the environment comprises: generating one or more of: predicted image data; predicted LIDAR data; predicted RADAR data; or predicted data derived from current and/or past sensor data; wherein the predicted data image data, predicted LIDAR data, predicted RADAR data, and predicted data derived from current and/or past sensor data is based on current and/or historical images, data and measurements.

5. The control system of claim 1, wherein the action neural network is located remotely from the control system.

6. The control system of claim 1, wherein the sensor data comprises one or more of: camera views; LIDAR measurements; RADAR measurements; Global Navigation Satellite System (GNSS) measurements; a compass reading; an inertial measurement unit (IMU) reading; or a speed or velocity.

7. The control system of claim 1, wherein the current state of the vehicle in the environment is encoded using sensor data and at least one of data derived from current sensor data and data derived from past sensor data.

8. The control system of claim 7, wherein the data derived from current sensor data comprises one or more of: distance from a center of the vehicle to a lane axis, or when a lane is not available, the current distance from the center of the vehicle to a predefined path; distance from the center of the vehicle to center line, left lane line, and right lane line; distance to other environmental references; or speed or velocity, and wherein the data derived from the past sensor data comprises one or more of: distance from a center of the vehicle to the lane axis, or when a lane is not available, the current distance from the center of the vehicle to a predefined path; distance from the center of the vehicle to center line, left lane line, and right lane line; distance to other environmental references; or speed or velocity.

9. The control system of claim 1, wherein the control system is a vehicle control system.

10. The control system of claim 1, wherein the processor is configured to cause the vehicle to perform the selected action sequence by causing the vehicle to perform the actions in the selected subsequent action sequence using one or more of the steering unit, the throttle unit and the braking unit.

11. The control system of claim 1, wherein the action neural network is trained by:
  predicting a subsequent state of the object in the environment (s') from a current state (s) and a current action (a) for each tuple in a sample data set D {(s, a, s')};
  calculating a reward for the predicted subsequent state (s'$_a$) in accordance with a reward function;
  selecting the predicted subsequent state (s'*) that produces a maximized reward;
  calculating a training error as the difference between the selected predicted subsequent state (s'*) and a subsequent state of the vehicle in the environment (s') from a sample data set D {(s, a, s')}; and
  updating parameters of the neural network to minimize a mean square error (MSE) of the training error.

12. The control system of claim 11, wherein the MSE is minimized using a least mean square (LMS) algorithm.

13. The control system of claim 11, wherein the MSE is defined in accordance with the following equation:

$$\sum_{i=1}^{n}(s' - s'^*(s, a))^2$$

wherein n is the number of values, wherein the sum is over all of the samples in the sample data set, wherein the samples are in the form (s, a, s'), and s'* (s, a) is the prediction of the subsequent state of the vehicle in the environment based on the selected state-action pair.

14. A method of selection of an action sequence for a vehicle using an action neural network comprising a plurality of layers, the method comprising:
  encoding sensor data received from a plurality of sensors for sensing a current state of the vehicle and an environment in which the vehicle is located, wherein the sensor data is encoded into a current state representing the vehicle the environment in which the vehicle is located;
  obtaining a plurality of action sequences for the vehicle, each action sequence comprising a plurality of actions for the vehicle, wherein each action comprises one or more of a steering angle for a steering unit of the vehicle, a throttle value for a throttle unit of the vehicle and braking value for a braking unit of the vehicle;
  for each action sequence in the plurality of action sequences:
    determining a state sequence comprising a plurality of predicted subsequent states (s'$_a$) of the vehicle in the environment based on the current state of the vehicle in the environment and the actions in the respective action sequence, wherein the layers of the action neural network map state-action pairs (s, a) to a subsequent state (s'$_a$) of the vehicle in the environment;
    determining a value of a policy function for the action sequence based on the determined state sequence; and
    selecting an action sequence in the plurality of action sequences having a maximum value of the policy function;
  providing the selected action sequence to a control system of the vehicle for causing the vehicle to perform the selected action sequence.

15. A non-transitory machine readable medium having tangibly stored thereon executable instructions of an action neural network comprising a plurality of layers for execution by a processor of a control system for a vehicle, wherein the executable instructions, in response to execution when executed by the processor, cause the action neural network to:
  encode sensor data received from a plurality of sensors for sensing a current state of the vehicle and an environment in which the vehicle is located, wherein the sensor data is encoded into a current state representing the vehicle the environment in which the vehicle is located;
  obtain a plurality of action sequences for the vehicle, each action sequence comprising a plurality of actions for the vehicle, wherein each action comprises one or more of a steering angle for a steering unit of the vehicle, a throttle value for a throttle unit of the vehicle and braking value for a braking unit of the vehicle;
  for each action sequence in the plurality of action sequences:
    determine a state sequence comprising a plurality of predicted subsequent states (s'$_a$) of the vehicle in the environment based on the current state of the vehicle in the environment and the actions in the respective action sequence, wherein layers of the plurality of layers of the action neural network map state-action pairs (s, a) to a subsequent state (s'$_a$) of the vehicle in the environment;
    determine a value of a policy function for the action sequence based on the determined state sequence;
    select an action sequence in the plurality of action sequences having a maximum value of the policy function;
  provide the selected action sequence to the control system for causing the vehicle to perform the selected action sequence.

16. A method of learning an action model for a vehicle in an environment using an action neural network comprising a plurality of layers, the method comprising:
  predicting by the action neural network a subsequent state of the object in the environment (s') from a current state (s) and a current action (a) for each tuple in a sample data set D {(s, a, s')}, wherein each action comprises one or more of a steering angle for a steering unit of the vehicle, a throttle value for a throttle unit of the vehicle and braking value for a braking unit of the vehicle, wherein the layers of the action neural network map state-action pairs (s, a) to a subsequent state (s'$_a$) of the vehicle in the environment;
  calculating a reward for the predicted subsequent state (s'$_a$) in accordance with a reward function;
  selecting the predicted subsequent state (s'*) that produces a maximized reward;
  calculating a training error as the difference between the selected predicted subsequent state (s'*) and a subsequent state of the vehicle in the environment (s') from a sample data set D {(s, a, s')}; and
  updating parameters of the neural network to minimize a mean square error (MSE) of the training error.

17. The method of claim 16, wherein the MSE is minimized using a least mean square (LMS) algorithm.

18. The method of claim 16, wherein the MSE is defined in accordance with the following equation:

$$\sum_{i=1}^{n}(s' - s'^*(s, a))^2$$

wherein n is the number of values, wherein the sum is over all of the samples in the sample data set, wherein the samples are in the form (s, a, s'), and s'* (s, a) is the prediction of the subsequent state of the vehicle in the environment based on the selected state-action pair.

* * * * *

UNITED STATES PATENT AND TRADEMARK OFFICE
CERTIFICATE OF CORRECTION

PATENT NO. : 10,997,491 B2
APPLICATION NO. : 15/725043
DATED : May 4, 2021
INVENTOR(S) : Hengshuai Yao et al.

It is certified that error appears in the above-identified patent and that said Letters Patent is hereby corrected as shown below:

In the Claims

In Column 16, Line 23 (Claim 2): "one or more predicted subsequent states" should read --predicted subsequent states--.

In Column 16, Line 65 (Claim 10): "actions in the selected subsequent action sequence" should read --actions in the selected action sequence--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*